(12) United States Patent
Huang

(10) Patent No.: US 11,475,244 B2
(45) Date of Patent: Oct. 18, 2022

(54) METHOD FOR TRAINING MODEL AND INFORMATION RECOMMENDATION SYSTEM

(71) Applicant: Guangdong Oppo Mobile Telecommunications Corp., Ltd., Guangdong (CN)

(72) Inventor: Shudong Huang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 1025 days.

(21) Appl. No.: 16/173,477

(22) Filed: Oct. 29, 2018

(65) Prior Publication Data

US 2019/0205701 A1    Jul. 4, 2019

(30) Foreign Application Priority Data

Dec. 29, 2017   (CN) .......................... 201711468861.2

(51) Int. Cl.
*G06F 15/16*    (2006.01)
*G06K 9/62*     (2022.01)
(Continued)

(52) U.S. Cl.
CPC ......... *G06K 9/6257* (2013.01); *G06K 9/6255* (2013.01); *G06N 5/041* (2013.01);
(Continued)

(58) Field of Classification Search
CPC .... G06K 9/6255; G06K 9/6257; H04L 67/22; H04L 43/00
(Continued)

(56) References Cited

U.S. PATENT DOCUMENTS 9,652,797 B2 * 5/2017 Vijayaraghavan .... G06F 16/951
2013/0346234 A1 * 12/2013 Hendrick ........... G06Q 30/0601
705/26.7
(Continued)

FOREIGN PATENT DOCUMENTS

CN    102508907 A    6/2012
CN    105975558 A    9/2016
(Continued)

OTHER PUBLICATIONS

Chinese Notice of First Review Opinion with English Translation for CN Application 201711468861 2 dated Jul. 23, 2021. (21 pages).
(Continued)

*Primary Examiner* — Yves Dalencourt
(74) *Attorney, Agent, or Firm* — Young Basile Hanlon & MacFarlane, P.C.

(57) ABSTRACT

A method for training a model are provided and an information recommendation system. The method includes the following. A reference training sample is obtained. A target training sample is obtained by inputting the reference training sample into a sample model. An updated target model is obtained by training a target model according to the target training sample. A target recommendation task is processed according to the updated target model, where the target recommendation task is a recommendation task for one or more target items to be recommended.

20 Claims, 5 Drawing Sheets

(51) Int. Cl.
 *G06N 20/00* (2019.01)
 *G06Q 30/02* (2012.01)
 *G06N 5/04* (2006.01)
 *H04L 67/50* (2022.01)

(52) U.S. Cl.
 CPC ......... *G06N 20/00* (2019.01); *G06Q 30/0241* (2013.01); *H04L 67/535* (2022.05)

(58) Field of Classification Search
 USPC .......................................................... 706/12
 See application file for complete search history.

(56) References Cited

U.S. PATENT DOCUMENTS

| 2014/0379618 | A1* | 12/2014 | Chen ...................... G06F 16/93 706/46 |
| 2016/0371589 | A1* | 12/2016 | Golbandi ............... G06N 20/00 |
| 2016/0379268 | A1 | 12/2016 | Song et al. |

FOREIGN PATENT DOCUMENTS

| CN | 106095942 A | 11/2016 |
| CN | 106503617 A | 3/2017 |
| CN | 106548210 A | 3/2017 |
| CN | 107273436 A | 10/2017 |

OTHER PUBLICATIONS

Chinese Second Office Action with English Translation for CN Application 201711468861.2 dated Dec. 16, 2021. (19 pages).
Summons to attend oral proceedings issued in corresponding European application No. 18204353.9 dated Jan. 12, 2021.
First Examination Report issued in corresponding IN application No. 201814041215 dated Dec. 21, 2020.
Communication pursuant to Article 94(3) EPC issued in corresponding European application No. 18204353.9 dated Jun. 2, 2020.
Extended European search report issued in corresponding European application No. 18204353.9 dated Apr. 9, 2019.
International search report issued in corresponding international application No. PCT/CN2018/112241 dated Feb. 2, 2019.

* cited by examiner

METHOD FOR TRAINING MODEL AND INFORMATION RECOMMENDATION SYSTEM

CROSS-REFERENCE TO RELATED APPLICATION(S)

This application claims priority to Chinese Patent Application No. 2017114688612, filed on Dec. 29, 2017, the content of which is hereby incorporated by reference in its entirety.

TECHNICAL FIELD

This disclosure relates to the field of machine learning technology, and particularly to a method for training a model and an information recommendation system.

BACKGROUND

In machine learning modeling, three elements: sample, feature, and model are contained. The sample plays a decisive role on the final effect. Samples are mainly obtained from manual annotation and user behavior extraction. However, samples based on the manual annotation and the user behavior extraction often have a lot of noise, generating by misoperation, cheating, etc. In this case, training by using samples with a lot of noise may have a great impact on the model.

SUMMARY

Implementations of the disclosure provide a method for training a model and an information recommendation system.

According to a first aspect of the implementations of the disclosure, a method for training a model is provided. The method for training a model is applicable to an information recommendation system, and the information recommendation system includes a sample model and a target model. The method includes the follows. A reference training sample is obtained. A target training sample is obtained by inputting the reference training sample into the sample model. An updated target model is obtained by training the target model according to the target training sample. A target recommendation task is processed according to the updated target model, where the target recommendation task is a recommendation task for one or more target items to be recommended.

According to a second aspect of the implementations of the disclosure, an information recommendation system is provided. The information recommendation system includes a processor and a memory configured to store executable program codes which, when executed, cause the processor to: obtain a reference training sample, obtain a target training sample by inputting the reference training sample into the sample model, obtain an updated target model by training the target model according to the target training sample, and process a target recommendation task according to the updated target model, where the target recommendation task is a recommendation task for one or more target items to be recommended.

According to a third aspect of the implementations of the disclosure, a method for training a model is provided. The method is applicable to an information recommendation system. The information recommendation system includes a first system and a second system. The second system includes a sample model and a target model. The method includes the follows.

The second system obtains a reference training sample. The second system obtains a target training sample by inputting the reference training sample into the sample model. The second system obtains an updated target model by training the target model according to the target training sample. The second system sends the updated target model to the first system, where the updated target model is configured for the first system to process a target recommendation task.

BRIEF DESCRIPTION OF THE DRAWINGS

The following briefly introduces the accompanying drawings required for describing the implementations.

DETAILED DESCRIPTION

Figure 1A:
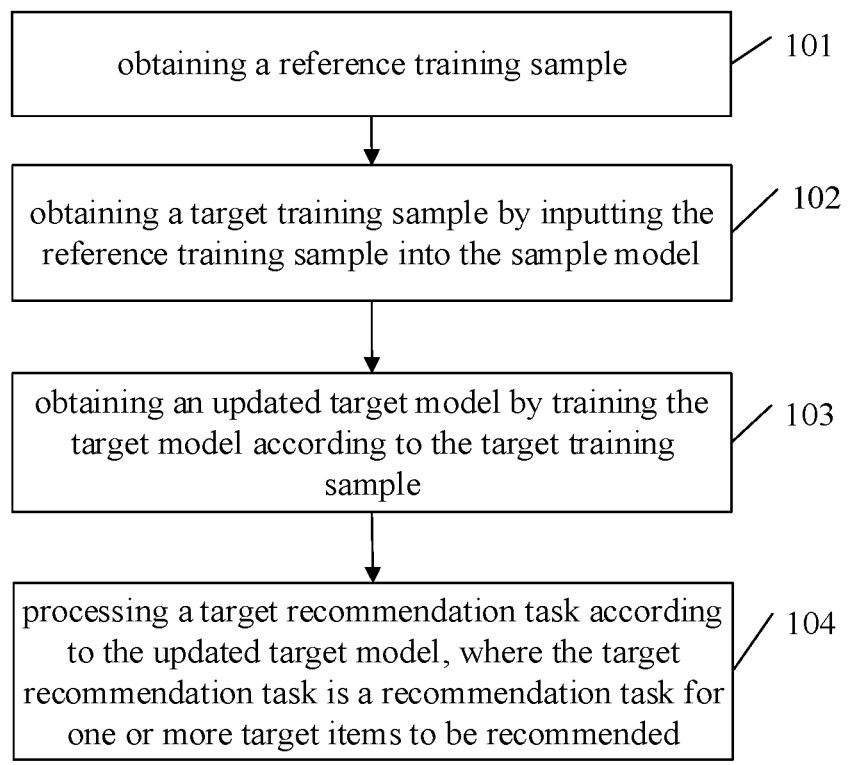
FIG. 1A is a schematic flow chart illustrating a method for training a model according to an implementation of the present disclosure.

In order to enable those skilled in the art to better understand solutions of the present disclosure, technical solutions in implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms "first", "second", and the like used in the specification, the claims, and the accompany drawings of the present disclosure are used to distinguish different objects rather than describe a particular order. The terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

In general design, in the field of Internet products, in the construction of recommendation and click-through-rate (CTR) estimation model, training samples of the target model are generally extracted from user-generated actions, but the samples are often noisy due to user cheating and misoperation.

In view of the above, the implementations of the disclosure provide a method for training a model, applicable to an information recommendation system. In this method, a reference training sample is obtained. A target training sample is obtained by inputting the reference training sample into the sample model. An updated target model is obtained by training the target model according to the target training sample. A target recommendation task is processed according to the updated target model. The information recommendation system can replace a manual rule with a sample model constructed based on a machine learning scheme and denoise and purify reference sample data via the sample model, thereby improving accuracy, generalization ability, and transfer ability of the target model.

As an implementation, the second system first obtains a reference training sample. Thereafter, the second system obtains a target training sample by inputting the reference training sample into the sample model. The second system then obtains an updated target model by training the target model according to the target training sample. At last, the second system sends the updated target model to the first system, where the updated target model is configured for the first system to process a target recommendation task. The second system can replace a manual rule with a sample model constructed based on a machine learning scheme and denoise and purify reference sample data via the sample model, thereby improving accuracy, generalization ability, and transfer ability of the target model.

The following describes the implementations of the disclosure in conjunction with the accompanying drawings.

FIG. 1A is a schematic flow chart illustrating a method for training a model according to an implementation of the present disclosure. The method is applicable to an information recommendation system. The information recommendation system includes a sample model and a target model. As illustrated in FIG. 1A, the method begins with operations at block 101.

At block 101, a reference training sample is obtained.

At block 102, a target training sample is obtained by inputting the reference training sample into the sample model.

At block 103, an updated target model is obtained by training the target model according to the target training sample At block 104, a target recommendation task is processed according to the updated target model. The target recommendation task is a recommendation task for one or more target items to be recommended.

As an implementation, the reference training sample includes at least one of: sample data extracted from a user log, sample data preset by developers, and sample data generated by integrating collected interaction information of a user.

As an implementation, the method further includes the follows.

Context behavior features is extracted from a user log. Loss feedback of the target model is obtained. The sample model is constructed according to the context behavior features and the loss feedback. It is to be noted that, the user log herein can be different from or the same as the forgoing user log for extracting sample data.

As an implementation, the context behavior features include at least one of: first interaction information obtained prior to recommending preset information to a preset application of a mobile terminal via the target model, where the first interaction information is recorded by the mobile terminal, and second interaction information obtained after recommending the preset information to the preset application of the mobile terminal via the target model, where the second interaction information is recorded by the mobile terminal. The first interaction information and the second interaction information each comprise an operation type and operation duration.

As an implementation, the loss feedback of the target model is obtained as follows.

An estimated prior result of processing a preset recommendation task by the target model is received, where the preset recommendation task is a recommendation task for the preset information. An actual posterior result of processing the preset recommendation task by the target model is obtained. The loss feedback of the target model is determined according to the estimated prior result and the actual posterior result.

As an implementation, the estimated prior result is obtained by inputting feature parameters and the target model into a predictor after obtaining the feature parameters required for processing the preset recommendation task by the target model. It is to be understood that, "estimated prior result" refers to a description of what is likely to happen in the future based on the information that you have now and the goal thereof is often most useful to generate a range of possible results that is precise enough to be useful even if input data may be incomplete, uncertain, or unstable. In one implementation, the estimated prior result can be a result produced depending on the predictor, the feature parameters, and the target model.

As an implementation, the actual posterior result of processing the preset recommendation task by the target model is obtained as follows.

The number of first users actually recommended by the preset recommendation task and the number of second users feeding back an interaction record are obtained. The actual posterior result of the target model is determined according to the number of the first users and the number of the second users. It is to be understood that, "actual posterior result" refers to a piece of information that is known to be true after taking into account the relevant evidence related to the particular case being examined. In one implementation, the actual posterior result can be a ratio of the number of users feeding back interaction to the number of user actually recommended.

It should be noted that, the method for training a model illustrated in FIG. 1A is applicable to an information recommendation system. As an implementation, the information recommendation system includes a first system and a second system, where the first system can be cloud computing resources or a server cluster and the second system can be a server cluster. Operations of the method for training a model illustrated in FIG. 1A can be conducted by at least one of: the first system, the second system, and the system and the second system, which is not limited herein.

Figure 1B:
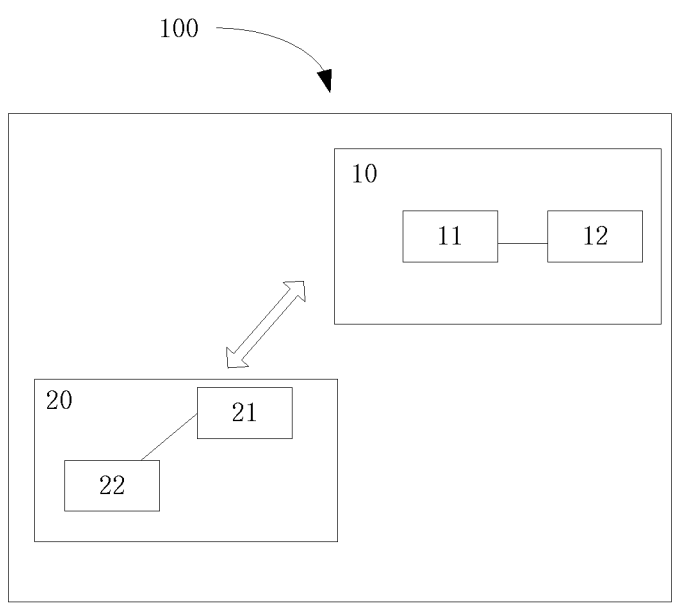
FIG. 1B is a system architecture of an information recommendation system.

FIG. 1B is a system architecture of an information recommendation system 100 according to an implementation of the present disclosure. The information recommendation system 100 may take the physical form of a server cluster and/or cloud computing resources, which is not limited herein. The information recommendation system 100 includes a first system 10 and a second system 20, where the second system 20 can be a server cluster and the first system 10 can be cloud computing resources or a server cluster. The first system 10 includes a trained target model 11 (in other words, an updated target model 11) and a predictor 12. The trained target model 11 is configured to process a real-time online recommendation task. The predictor 12 is configured to generate an estimated prior result in conjunction with the trained target model 11 and reference feature data associated with the recommendation task. The second system 20 includes a sample model 21 and a to-be-trained target model 22. The second system 20 is configured to periodically train the to-be-trained target model 22 by using reference training sample and the sample model 21, to obtain the trained target model 11, and to push the trained target model 11 to the first system 10 for use.

As an implementation, the first system 10 can refer to an online system, and the second system 20 can refer to an offline system.

The reference sample data may be sample data extracted by the second system from a pre-stored user log, sample data preset by developers, sample data generated by integrating collected interaction information of a user via the first system, or the like. The disclosure is not particularly restricted.

Figure 2:
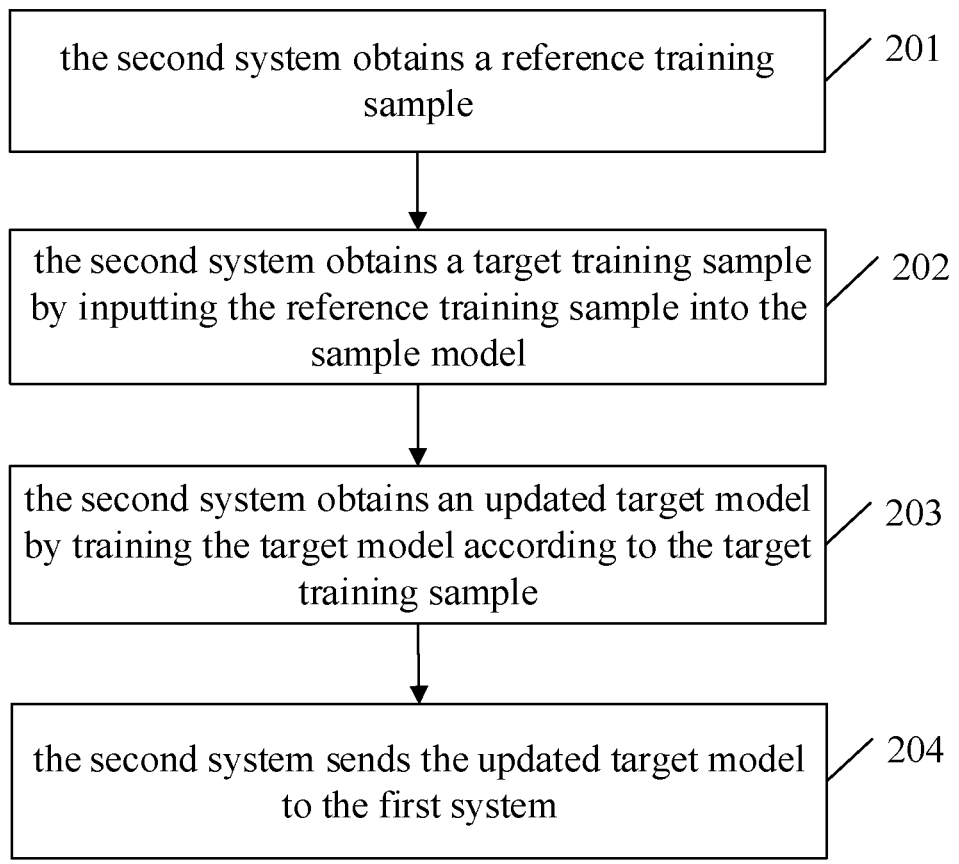
FIG. 2 is a schematic flow chart illustrating a method for training a model according to an implementation of the present disclosure.

FIG. 2 is a schematic flow chart illustrating a method for training a model according to an implementation of the present disclosure. The method is applicable to an information recommendation system. The information recommendation system includes a first system and a second system. The second system includes a sample model and a target model. As illustrated in FIG. 2, the method begins with operations at block 201.

At block 201, the second system obtains a reference training sample.

The reference sample data (in other words, reference training sample) may be sample data extracted by the second system from a pre-stored user log, sample data preset by developers, sample data generated by integrating collected interaction information of a user via the first system, or the like. The disclosure is not particularly restricted.

At block 202, the second system obtains a target training sample by inputting the reference training sample into the sample model.

The reference training sample can be selected, denoised, and purified via the sample model, to obtain the target training sample and then the target training sample can be input into the target model for training.

At block 203, the second system obtains an updated target model by training the target model according to the target training sample.

The target model can be trained with a gradient descent method, a quasi-Newton method, and the like. The disclosure is not limited herein.

At block 204, the second system sends the updated target model to the first system. The updated target model is configured for the first system to process a target recommendation task.

The target recommendation task is a recommendation task for one or more target items to be recommended, such as information push regarding ten news booths and two advertisement booths in a browser application scenario.

According to the implementation of the disclosure, the second system first obtains the reference training sample. Thereafter, the second system obtains the target training sample by inputting the reference training sample into the sample model. The second system then obtains the updated target model by training the target model according to the target training sample. At last, the second system sends the updated target model to the first system, where the updated target model is configured for the first system to process the target recommendation task. The second system can replace a manual rule (in other words, manual annotation and user behavior extraction) with a sample model constructed based on a machine learning scheme and denoise and purify the reference sample data via the sample model. It is possible to improve accuracy, generalization ability, and transfer ability of the target model.

In one possible implementation, the method further includes the follows.

The second system extracts context behavior features from a user log. The second system obtains loss feedback of the target model. The second system constructs the sample model according to the context behavior features and the loss feedback.

As one implementation, the second system may construct the sample model based on a preset machine learning scheme such as a logistic regression (LR), a gradient boosting decision tree (GBDT), a deep learning scheme, or the like.

As one implementation, the loss feedback is associated with features of the target model and the features are associated with the sample data. If the loss feedback is large, it indicates that corresponding features have a greater impact on accuracy of the target model; otherwise, it indicates that the corresponding features have a less impact on the accuracy of the target model. In this way, the second system can select out features having a greater or a less impact on the accuracy of the target model according to the loss feedback. The features are then used as one of factors for constructing the sample model, to improve accuracy of the sample model.

In this implementation, the second system can construct the sample model based on the context behavior features of the user, the loss feedback of the target model, and other factors and can efficiently denoise and purify the reference sample data via the sample model, thereby improving the accuracy of the target model.

In this possible implementation, the context behavior features include at least one of: first interaction information obtained by the first system prior to recommending preset information to a preset application of a mobile terminal via the target model, where the first interaction information is recorded by the mobile terminal and second interaction information obtained by the first system after recommending the preset information to the preset application of the mobile terminal via the target model, where the second interaction information is recorded by the mobile terminal. The first interaction information and the second interaction information each includes an operation type and an operation duration.

The preset application may be a system application of the mobile terminal such as a browser, an application store, or the like or a third-party application of the mobile terminal, which is not limited herein.

The following describes a browser application of the mobile terminal as an example. The mobile terminal responds to a user operation, opens the browser application, and presents a news list pushed on an application main interface. The first system pushes a news sequence to the browser application based on the target model. The news list includes news information and advertisement information. At the same time, the mobile terminal will collect interaction information before the first system pushes the news sequence to the browser application and interaction information after the first system pushes the news sequence to the browser application, and send the interaction information collected to the first system in real time. Thereafter, the first system sends the interaction information collected to the second system as context behavior features. The interaction information includes operation information on the mobile terminal, duration of stay on an application, an interface, etc., and the like.

In this implementation, since the context behavior features can accurately reflect information such as preferences of the user on the item pushed and the like, when constructing the sample data based on the information, the second system can select effective feature data more accurately based on the context behavior features. As a result, accuracy of the sample data can be improved and training quality of the target model can also be improved.

In one possible implementation, the second system obtains the loss feedback of the target model as follows.

The second system receives an estimated prior result of processing a preset recommendation task by the target model from the first system, where the preset recommendation task is a recommendation task for the preset information. The second system obtains an actual posterior result of processing the preset recommendation task by the target model. The second system determines the loss feedback of the target model according to the estimated prior result and the actual posterior result.

The preset information can be a target item to be recommended. The preset recommendation task is a recommendation task for the target item to be recommended. For example, in the browser application scenario, when the first system pushes news and an advertisement needs to be pushed, a recommendation task for the advertisement will be generated.

In this implementation, the loss feedback of the target model is determined according to both the estimated prior result and the actual posterior result, which is in line with usage habits of actual user groups and has high accuracy.

In one possible implementation, the estimated prior result is obtained by inputting feature parameters and the target model into a predictor after the first system obtains the feature parameters required for processing the preset recommendation task by the target model.

The feature parameters include user portrait information (such as preferences, interests, geographic locations, etc.), information of items to be recommended (such as keywords, categories, etc.), and scenario information (such as holidays, travel, etc.).

The second system obtains the actual posterior result of processing the preset recommendation task by the target model as follows.

The second system obtains the number of first users actually recommended by the preset recommendation task and the number of second users feeding back an interaction record. The second system determines the actual posterior result of the target model according to the number of the first users and the number of the second users.

The actual posterior result may be a ratio of the number of users feeding back interaction to a total number of users recommended.

For example, if the item to be recommended of the target recommendation task is recommended to 100 users and 10 users click "yes" (in other words, 10 users feed interaction back), the actual posterior result of the target recommendation task is 10/100, that is 0.1.

In this implementation, the estimated prior result can be obtained by the predictor of the first system. In this way, there is no need to build a calculation model in real time for estimation. As a result, calculation efficiency and accuracy can be high. In addition, the actual posterior result is obtained according to actual interaction data of the user, and therefore the accuracy can be high.

Figure 3:
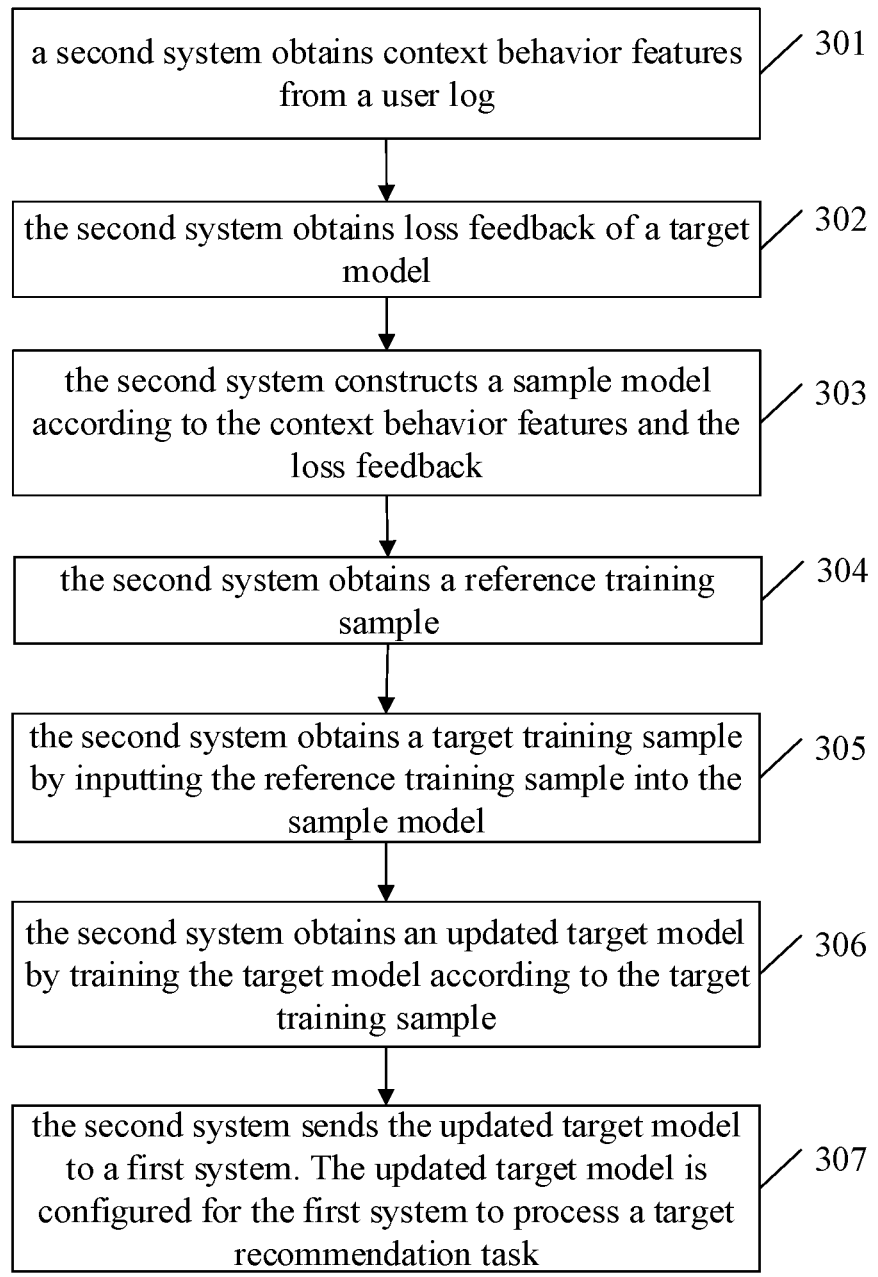
FIG. 3 is a schematic flow chart illustrating a method for training a model according to an implementation of the present disclosure.

Consistent with the implementations illustrated in FIG. 2, FIG. 3 is a schematic flow chart illustrating a method for training a model according to an implementation of the present disclosure. Comparing with the implementation illustrated in FIG. 2, the method for training a model according to the implementation illustrated in FIG. 3 describes how a sample model is constructed in detail. As illustrated in FIG. 3, the method begins with operations at block 301.

At block 301, a second system extracts context behavior features from a user log.

At block 302, the second system obtains loss feedback of a target model.

At block 303, the second system constructs a sample model according to the context behavior features and the loss feedback.

At block 304, the second system obtains a reference training sample.

At block 305, the second system obtains a target training sample by inputting the reference training sample into the sample model.

At block 306, the second system obtains an updated target model by training the target model according to the target training sample.

At block 307, the second system sends the updated target model to a first system. The updated target model is configured for the first system to process a target recommendation task.

According to the implementation of the disclosure, the second system first obtains the reference training sample. Thereafter, the second system obtains the target training sample by inputting the reference training sample into the sample model. The second system then obtains the updated target model by training the target model according to the target training sample. At last, the second system sends the updated target model to the first system, where the updated target model is configured for the first system to process the target recommendation task. The second system can replace a manual rule with a sample model constructed based on a machine learning scheme and denoise and purify reference sample data via the sample model. In this way, accuracy, generalization ability, and transfer ability of the target model can be improved.

In addition, the second system can construct the sample model based on the context behavior features of a user, the loss feedback of the target model, and other factors and can efficiently denoise and purify the reference sample data via the sample model, thereby improving the accuracy of the target model.

Figure 4:
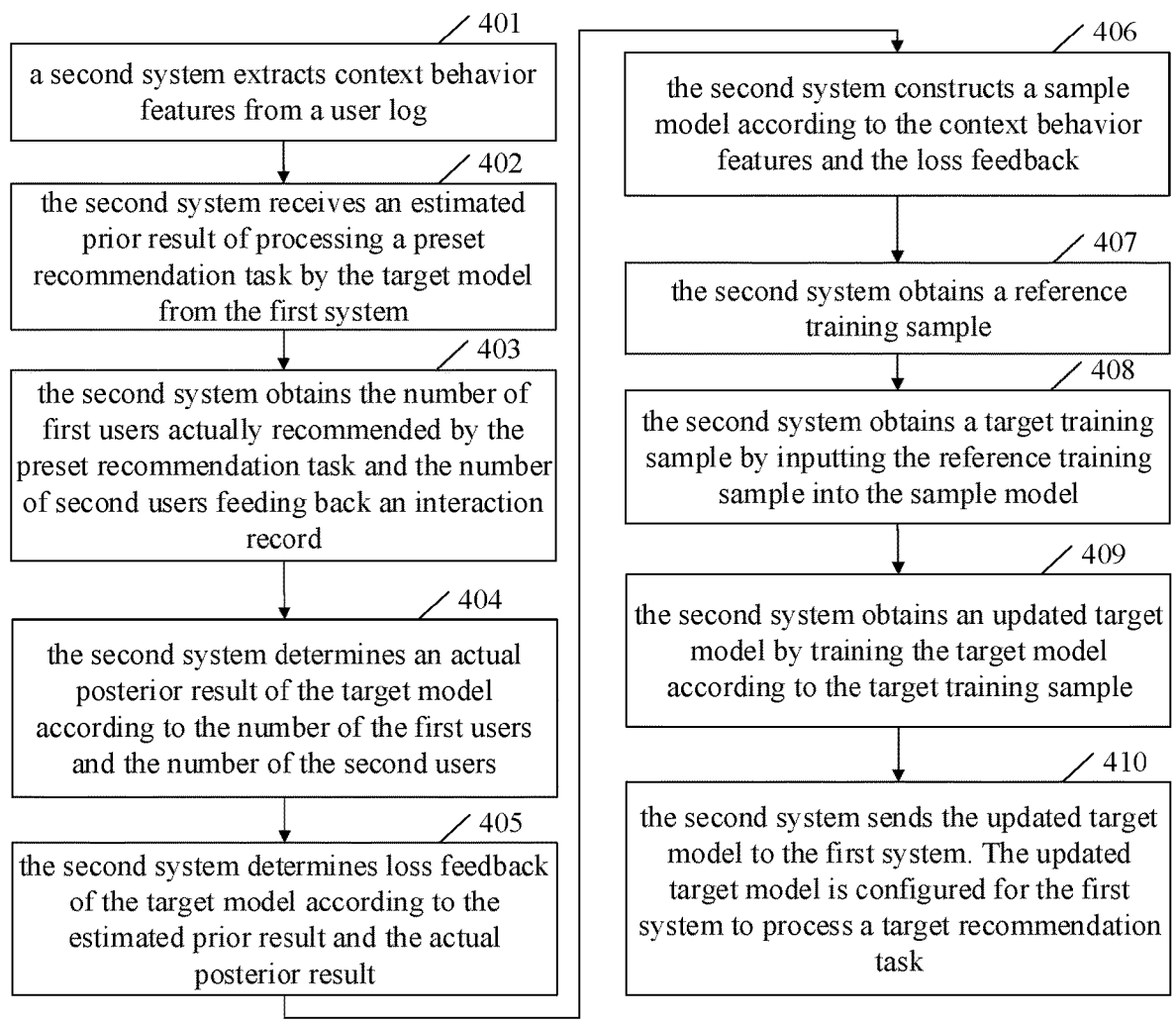
FIG. 4 is a schematic flow chart illustrating a method for training a model according to an implementation of the present disclosure.

Consistent with the implementations illustrated in FIG. 2, FIG. 4 is a schematic flow chart illustrating a method for training a model according to an implementation of the present disclosure. Comparing with the implementation illustrated in FIG. 2, the method for training a model according to the implementation illustrated in FIG. 4 describes how a sample model is constructed in detail and how loss feedback of a target model is calculated further. As illustrated in FIG. 4, the method begins with operations at block 401.

At block 401, a second system extracts context behavior features from a user log.

The context behavior features include at least one of: first interaction information obtained by a first system prior to recommending preset information to a preset application of a mobile terminal via a target model, where the first interaction information is recorded by the mobile terminal and second interaction information obtained by the first system after recommending the preset information to the preset application of the mobile terminal via the target model, where the second interaction information is recorded by the mobile terminal. The first interaction information and the second interaction information each includes an operation type and an operation duration.

At block 402, the second system receives an estimated prior result of processing a preset recommendation task by the target model from the first system.

The estimated prior result is obtained by inputting feature parameters and the target model into a predictor after the first system obtains the feature parameters required for processing the preset recommendation task by the target model.

At block 403, the second system obtains the number of first users actually recommended by the preset recommendation task and the number of second users feeding back an interaction record.

At block 404, the second system determines an actual posterior result of the target model according to the number of the first users and the number of the second users.

At block 405, the second system determines loss feedback of the target model according to the estimated prior result and the actual posterior result.

At block 406, the second system constructs a sample model according to the context behavior features and the loss feedback.

At block 407, the second system obtains a reference training sample.

At block 408, the second system obtains a target training sample by inputting the reference training sample into the sample model.

At block 409, the second system obtains an updated target model by training the target model according to the target training sample.

At block 410, the second system sends the updated target model to the first system. The updated target model is configured for the first system to process a target recommendation task.

According to the implementation of the disclosure, the second system first obtains the reference training sample. Thereafter, the second system obtains the target training sample by inputting the reference training sample into the sample model. The second system then obtains the updated target model by training the target model according to the target training sample. At last, the second system sends the updated target model to the first system, where the updated target model is configured for the first system to process the target recommendation task. The second system can replace a manual rule with a sample model constructed based on a machine learning scheme and denoise and purify reference sample data via the sample model, thereby improving accuracy, generalization ability, and transfer ability of the target model.

In addition, the second system can construct the sample model based on the context behavior features of a user, the loss feedback of the target model, and other factors and can efficiently denoise and purify the reference sample data via the sample model, thereby improving the accuracy of the target model.

Moreover, since the context behavior features can accurately reflect information such as preferences of the user on the item pushed and the like, when constructing the sample data based on the information, the second system can select effective feature data more accurately based on the context behavior features. Consequently, accuracy of the sample data can be improved and training quality of the target model can also be improved.

Furthermore, the loss feedback of the target model is determined according to both the estimated prior result and the actual posterior result, which is in line with usage habits of actual user group and has high accuracy.

Furthermore, the estimated prior result can be obtained by the predictor of the first system. In this way, there is no need to build a calculation model in real time for estimation. As a result, calculation efficiency and accuracy can be high. In addition, the actual posterior result is obtained according to actual interaction data of the user, and therefore the accuracy can be high.

Figure 5:
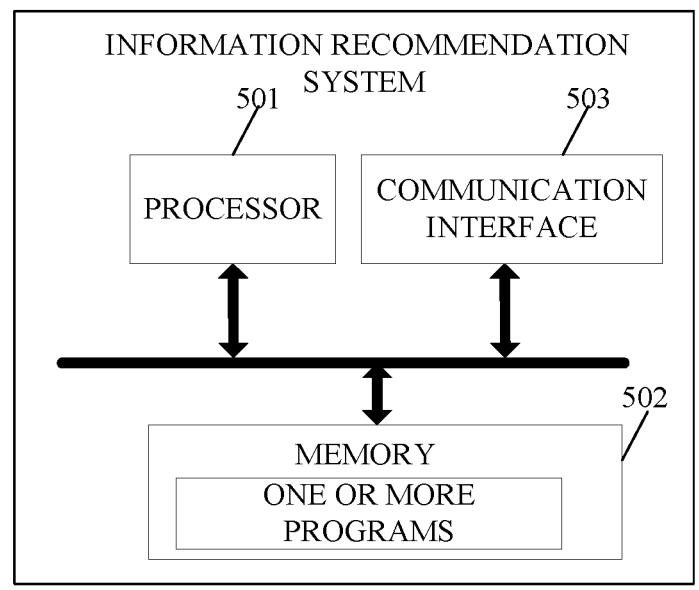
FIG. 5 is a schematic structural diagram illustrating a second system according to an implementation of the present disclosure.

Consistent with the implementations illustrated in FIG. 2 to FIG. 4, FIG. 5 is a schematic structural diagram illustrating an information recommendation system according to an implementation of the present disclosure. As illustrated in FIG. 5, the information recommendation system includes at least one processor 501, a memory 502, and a communication interface 503. The memory is configured to store one or more programs. The one or more programs are configured to be executed by the processor and include instructions operable to execute the following operations.

A reference training sample is obtained. A target training sample is obtained by inputting the reference training sample into a sample model. An updated target model is obtained by training a target model according to the target training sample. A target recommendation task is processed according to the updated target model.

According to the implementation of the disclosure, a reference training sample is obtained. Thereafter, a target training sample is obtained by inputting the reference training sample into the sample model. An updated target model is obtained by training the target model according to the target training sample. At last, a target recommendation task is processed according to the updated target model. The information recommendation system can replace a manual rule with a sample model constructed based on a machine learning scheme and denoise and purify reference sample data via the sample model, thereby improving accuracy, generalization ability, and transfer ability of the target model.

As one implementation, the programs further include instructions operable to execute the following operations. Context behavior features are extracted from a user log. Loss feedback of the target model is obtained. The sample model is constructed according to the context behavior features and the loss feedback.

As one implementation, the context behavior features include at least one of: first interaction information obtained prior to recommending preset information to a preset application of a mobile terminal via the target model, where the first interaction information is recorded by the mobile terminal and second interaction information obtained after recommending the preset information to the preset application of the mobile terminal via the target model, where the second interaction information is recorded by the mobile terminal. The first interaction information and the second interaction information each includes an operation type and an operation duration.

As one implementation, in terms of the obtaining loss feedback of the target model, the instructions of the programs are operable to execute the following. An estimated prior result of processing a preset recommendation task by the target model is received, where the preset recommendation task is a recommendation task for the preset information. An actual posterior result of processing the preset recommendation task by the target model is obtained. The loss feedback of the target model is determined according to the estimated prior result and the actual posterior result.

As one implementation, the estimated prior result is obtained by inputting feature parameters and the target model into a predictor after obtaining the feature parameters required for processing the preset recommendation task by the target model.

In terms of the obtaining an actual posterior result of processing the preset recommendation task by the target model, the instructions of the programs are operable to execute the following. The number of first users actually recommended by the preset recommendation task and the number of second users feeding back an interaction record are obtained. The actual posterior result of the target model is determined according to the number of the first users and the number of the second users.

Figure 6:
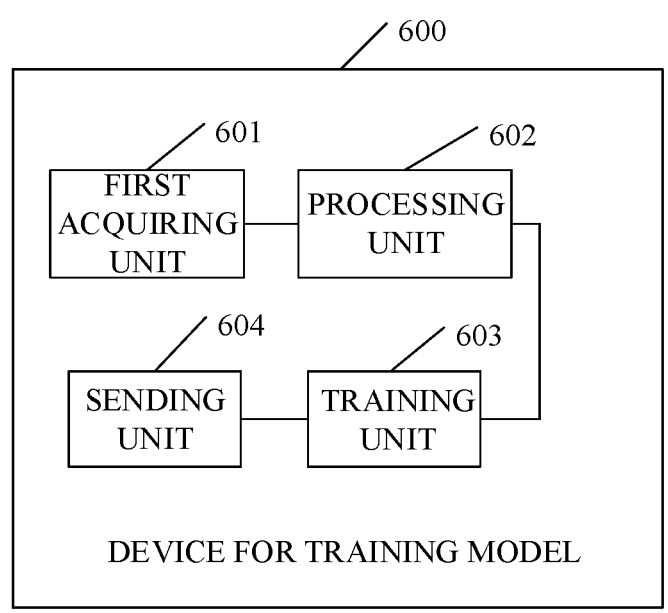
FIG. 6 is a block diagram illustrating functional units of a device for training a model according to an implementation of the present disclosure.

FIG. 6 is a block diagram illustrating functional units of a device for training a model according to an implementation of the present disclosure. The device 600 is applicable to an information recommendation system. The information recommendation system includes a first system and a second system. The second system includes a sample model and a target model. The device includes a first obtaining unit 601, a processing unit 602, a training unit 603, and a sending unit 604.

The first obtaining unit 601 is configured to obtain a reference training sample. The processing unit 602 is configured to obtain a target training sample by inputting the reference training sample into the sample model. The training unit 603 is configured to obtain an updated target model by training the target model according to the target training sample. The sending unit 604 is configured to send the updated target model to the first system, where the updated target model is configured for the first system to process a target recommendation task.

According to the implementation of the disclosure, the second system first obtains the reference training sample. Thereafter, the second system obtains the target training sample by inputting the reference training sample into the sample model. The second system then obtains the updated target model by training the target model according to the target training sample. At last, the second system sends the updated target model to the first system, where the updated target model is configured for the first system to process the target recommendation task. The second system can replace a manual rule with a sample model constructed based on a machine learning scheme and denoise and purify reference sample data via the sample model, thereby improving accuracy, generalization ability, and transfer ability of the target model.

As one implementation, the device further includes an extracting unit, a second obtaining unit, and a constructing unit.

The extracting unit is configured to extract context behavior features from a user log. The second obtaining unit is configured to obtain loss feedback of the target model. The constructing unit is configured to construct the sample model according to the context behavior features and the loss feedback.

As one implementation, the context behavior features include at least one of: first interaction information obtained by the first system prior to recommending preset information to a preset application of a mobile terminal via the target model, where the first interaction information is recorded by the mobile terminal and second interaction information obtained by the first system after recommending the preset information to the preset application of the mobile terminal via the target model, where the second interaction information is recorded by the mobile terminal. The first interaction information and the second interaction information each includes an operation type and an operation duration.

As one implementation, the first obtaining unit 601 configured to obtain the loss feedback of the target model is configured to receive an estimated prior result of processing a preset recommendation task by the target model from the first system, where the preset recommendation task is a recommendation task for the preset information, to obtain an actual posterior result of processing the preset recommendation task by the target model, and to determine the loss feedback of the target model according to the estimated prior result and the actual posterior result.

As one implementation, the estimated prior result is obtained by inputting feature parameters and the target model into a predictor after the first system obtains the feature parameters required for processing the preset recommendation task by the target model.

The first obtaining unit 601 configured to obtain the actual posterior result of processing the preset recommendation task by the target model is configured to obtain the number of first users actually recommended by the preset recommendation task and the number of second users feeding back an interaction record and to determine the actual posterior result of the target model according to the number of the first users and the number of the second users.

It is to be noted that, the device described in the device implementation of the disclosure is presented in the form of functional units. The term "unit" used herein should be understood as the broadest meaning as possible, and an object for implementing functions defined by each "unit" may be, for example, an integrated circuit (ASIC), a single circuit, a processor (shared, dedicated, or chipset) and a memory for executing one or more software or firmware programs, a combinational logic circuit, and/or other suitable components that can achieve the above described functions.

The first obtaining unit 601 can be a receiver. The processing unit 602 and the training unit 603 may be a processor or a controller. The sending unit 604 may be a transmitter.

Implementations of the present disclosure also provide a non-transitory computer storage medium. The non-transitory computer storage medium stores computer programs for electronic data interchange which, when executed, are operable with a computer to execute all or part of the operations of any of the methods described in the above-described method implementations. Implementations of the present disclosure also provide a computer program product. The computer program product includes a non-transitory computer readable storage medium that stores computer programs. The computer programs are operable with a computer to perform all or part of the operations of any of the methods described in the above method implementations. The computer program product may be a software installation package.

It is to be noted that, for the sake of simplicity, the foregoing method implementations are described as a series of action combinations, however, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, the apparatus disclosed in implementations provided herein may be implemented in other manners. For example, the device/apparatus implementations described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random-access memory (RAM), a removable hard disk, Disk, compact disc (CD), or the like.

It will be understood by those of ordinary skill in the art that all or a part of the various methods of the implementations described above may be accomplished by means of a program to instruct associated hardware, the program may be stored in a computer readable memory, which may include a flash memory, a read-only memory (ROM), a random-access memory (RAM), Disk or compact disc (CD), and so on.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for training a model, applicable to an information recommendation system, the information recommendation system comprising a first system and a second system, the second system comprising a sample model and a target model, the method comprising:
    obtaining, via the second system, a reference training sample;
    obtaining, via the second system, a target training sample by inputting the reference training sample into the sample model;
    obtaining, via the second system, an updated target model by training the target model according to the target training sample;
    sending, via the second system, the updated target model to the first system; and
    processing, via the first system, a target recommendation task according to the updated target model, the target recommendation task being a recommendation task for one or more target items to be recommended; wherein the first system is an online system and the second system is an offline system.

2. The method of claim 1, wherein the reference training sample comprises at least one of: sample data extracted from a user log, sample data preset by developers, and sample data generated by integrating collected interaction information of a user.

3. The method of claim 1, further comprising:
    extracting, via the second system, context behavior features from a user log;
    obtaining, via the second system, loss feedback of the target model; and
    constructing, via the second system, the sample model according to the context behavior features and the loss feedback.

4. The method of claim 3, wherein the context behavior features comprise at least one of:
    first interaction information obtained prior to recommending preset information to a preset application of a mobile terminal via the target model; the first interaction information being recorded by the mobile terminal; and
    second interaction information obtained after recommending the preset information to the preset application of the mobile terminal via the target model; the second interaction information being recorded by the mobile terminal; the first interaction information and the second interaction information each comprising an operation type and an operation duration.

5. The method of claim 4, wherein obtaining, via the second system, the loss feedback of the target model comprises:
receiving, via the second system, an estimated prior result of processing a preset recommendation task by the target model, wherein the preset recommendation task is a recommendation task for the preset information;
obtaining, via the second system, an actual posterior result of processing the preset recommendation task by the target model; and
determining, via the second system, the loss feedback of the target model according to the estimated prior result and the actual posterior result.

6. The method of claim 5, wherein the estimated prior result is obtained by inputting feature parameters and the target model into a predictor after obtaining the feature parameters required for processing the preset recommendation task by the target model.

7. The method of claim 5, wherein obtaining, via the second system, the actual posterior result of processing the preset recommendation task by the target model comprises:
obtaining the number of first users actually recommended by the preset recommendation task and the number of second users feeding back an interaction record; and
determining the actual posterior result of the target model according to the number of the first users and the number of the second users.

8. An information recommendation system, comprising:
at least one processor of a first system and a second system, the first system being an online system and the second system being a offline system; and
a memory configured to store executable program codes which, when executed, cause the processor of the second system to:
obtain a reference training sample;
obtain a target training sample by inputting the reference training sample into a sample model;
obtain an updated target model by training a target model according to the target training sample; and
send the updated target model to the first system; and cause the processor of the first system to:
process a target recommendation task according to the updated target model, the target recommendation task being a recommendation task for one or more target items to be recommended.

9. The information recommendation system of claim 8, wherein the reference training sample comprises at least one of:
sample data extracted from a user log, sample data preset by developers, and sample data generated by integrating collected interaction information of a user.

10. The information recommendation system of claim 8, wherein the executable program codes further cause the processor of the second system to:
extract context behavior features from a user log;
obtain loss feedback of the target model; and
construct the sample model according to the context behavior features and the loss feedback.

11. The information recommendation system of claim 10, wherein the context behavior features comprise at least one of:
first interaction information obtained prior to recommending preset information to a preset application of a mobile terminal via the target model; the first interaction information being recorded by the mobile terminal; and
second interaction information obtained after recommending the preset information to the preset application of the mobile terminal via the target model; the second interaction information being recorded by the mobile terminal; the first interaction information and the second interaction information each comprising an operation type and an operation duration.

12. The information recommendation system of claim 11, wherein the executable program codes causing the processor of the second system to obtain the loss feedback of the target model cause the processor of the second system to:
receive an estimated prior result of processing a preset recommendation task by the target model, wherein the preset recommendation task is a recommendation task for the preset information;
obtain an actual posterior result of processing the preset recommendation task by the target model; and
determine the loss feedback of the target model according to the estimated prior result and the actual posterior result.

13. The information recommendation of claim 12, wherein the estimated prior result is obtained by inputting feature parameters and the target model into a predictor after obtaining the feature parameters required for processing the preset recommendation task by the target model.

14. The information recommendation of claim 12, wherein the executable program codes causing the processor of the second system to obtain the actual posterior result of processing the preset recommendation task by the target model cause the processor of the second system to:
obtain the number of first users actually recommended by the preset recommendation task and the number of second users feeding back an interaction record; and
determine the actual posterior result of the target model according to the number of the first users and the number of the second users.

15. A method for training a model, applicable to a second system of an information recommendation system, the second system comprising a sample model and a target model, the method comprising:
obtaining, by the second system, a reference training sample;
obtaining, by the second system, a target training sample by inputting the reference training sample into the sample model;
obtaining, by the second system, an updated target model by training the target model according to the target training sample; and
sending, by the second system, the updated target model to a first system of the information recommendation system; the updated target model being configured for the first system to process a target recommendation task; wherein the first system is an online system and the second system is an offline system.

16. The method of claim 15, further comprising:
extracting, by the second system, context behavior features from a user log;
obtaining, by the second system, loss feedback of the target model; and
constructing, by the second system, the sample model according to the context behavior features and the loss feedback.

17. The method of claim 16, wherein the context behavior features comprise at least one of:
- first interaction information obtained by the first system prior to recommending preset information to a preset application of a mobile terminal via the target model; the first interaction information being recorded by the mobile terminal; and
- second interaction information obtained by the first system after recommending the preset information to the preset application of the mobile terminal via the target model; the second interaction information being recorded by the mobile terminal; the first interaction information and the second interaction information each comprising an operation type and an operation duration.

18. The method of claim 17, wherein obtaining, by the second system, the loss feedback of the target model comprises:
- receiving, by the second system, an estimated prior result of processing a preset recommendation task by the target model from the first system, wherein the preset recommendation task is a recommendation task for the preset information;
- obtaining, by the second system, an actual posterior result of processing the preset recommendation task by the target model; and
- determining, by the second system, the loss feedback of the target model according to the estimated prior result and the actual posterior result.

19. The method of claim 18, wherein the estimated prior result is obtained by inputting feature parameters and the target model into a predictor after the first system obtains the feature parameters required for processing the preset recommendation task by the target model.

20. The method of claim 18, wherein obtaining, by the second system, the actual posterior result of processing the preset recommendation task by the target model comprises:
- obtaining, by the second system, the number of first users actually recommended by the preset recommendation task and the number of second users feeding back an interaction record; and
- determining, by the second system, the actual posterior result of the target model according to the number of the first users and the number of the second users.

* * * * *